United States Patent [19]

Jarnagin

[11] Patent Number: 4,639,348
[45] Date of Patent: Jan. 27, 1987

[54] RECYCLOTRON III, A RECIRCULATING PLASMA FUSION SYSTEM

[76] Inventor: William S. Jarnagin, P.O. Box 127, Concord, Mass. 01742

[21] Appl. No.: 670,806

[22] Filed: Nov. 13, 1984

[51] Int. Cl.$^4$ .......................... G21B 1/02; G21D 7/00; H05H 1/14; H05H 1/24
[52] U.S. Cl. .................................. 376/107; 376/127; 376/128; 376/129; 376/147; 313/62; 328/234
[58] Field of Search ............... 376/107, 121, 127, 128, 376/129, 130, 112, 147; 313/62; 328/234, 235

[56] References Cited

U.S. PATENT DOCUMENTS

| | | | |
|---|---|---|---|
| 1,948,384 | 2/1934 | Lawrence | 313/62 |
| 2,748,339 | 5/1956 | Rudenberg | 376/147 |
| 3,155,592 | 11/1964 | Hansen et al. | 376/107 |
| 3,243,348 | 3/1966 | Hansen et al. | 376/107 |
| 3,789,335 | 1/1974 | Delphin et al. | 313/62 |
| 4,189,346 | 2/1980 | Jarnagin | 376/107 |
| 4,202,725 | 5/1980 | Jarnagin | 376/107 |
| 4,401,618 | 8/1983 | Salisbury | 376/106 |

OTHER PUBLICATIONS

Chen, F. F., "Introduction to Plasma Physics", Plenum Press, New York & London, 1977, pp. 304–305, (R. F. Post's D.C. Electrical Output Device).

*Primary Examiner*—Lowell A. Larson
*Assistant Examiner*—William E. Terrell

[57] ABSTRACT

This is one of a series of nuclear fusion (vs. fission) inventions by this physicist-inventor. This invention is designed to burn the cleanest of all known fusion fuels: boron hydride (B-H, or p-$^{11}$B). Boron hydride has no free neutrons on either side of its reaction equation: $p + ^{11}B = 3\alpha + W$. If this fuel can be made to fuse as planned the many problems associated with neutron-based fuels, deuterium-tritium (D-T) in particular, can be obviated. D-T gives off 80% of its energy in the form of neutrons. These make the apparatus radioactive; and the neutrons may be used to breed weapons grade fission material. Whereas, p-$^{11}$B cannot be used to make fission bomb material; its product particles are entirely safe inert helium particles. B-H fuel is abundant, available and inexpensive. Boron hydride comes in gas, liquid or solid form, stable or unstable. The invention at hand proposes to accelerate macromolecular ions of boron hydride (such as $B_2H_6$) into one another, then reaccelerate the debris ions (p, $^{11}$B) into one another also. This is to be done by recyclotrons—cyclotrons modified to recirculate a similar device's output. Recyclotrons take advantage of the fact that modest energies to a particle accelerator correspond to enormous kinetic temperatures in a plasma.

5 Claims, 9 Drawing Figures

RECYCLOTRON III, A RECIRCULATING PLASMA FUSION SYSTEM

The present invention relates generally to the production of energy through nuclear fusion and includes significant changes over generally similar efforts by the inventor represented in applications Ser. No. 05/887,442, now U.S. Pat. No. 4,189,346, and Ser. No. 06/387,974, now abandoned.

BACKGROUND OF THE INVENTION

Conventional nuclear fusion machines (tokamaks, mirrors, tandem mirrors, ...) are designed to fuse only deuterium-tritium (D-T or d-t). This fuel gives off 80% of its energy in the form of fast neutrons. These, in turn, irradiate the apparatus and transmute it to radioactive isotopes. This makes the apparatus "too hot to handle" and results in lengthy shutdowns, the use of remote control industrial manipulators, etc. Furthermore, neutrons from d-t fuel can be used to transmute common U-238 into nuclear fission bomb material. This would be much easier than separating U-235 from U-238 by gas diffusion apparatus.

Still more, d-t neutrons must be shielded from the supercooled coils of the machines. This takes room—about 1.5 meters of shielding thickness. This factor plus the inherent low power density of these devices, would make these power plants large, complicated, expensive and of questionable acceptance by the utility companies.

Accordingly, a way is needed to fuse cleaner proton (vs. neutron) based fuel. The cleanest, least neutron-emissive, of all known fuels is boron hydride or protons-boron-11. It has no free neutrons on either side of its equation $p + {}^{11}B = 3\alpha + W$, where the three alphas, $\alpha$, are helium nuclei and W is the energy release per fusion reaction. Helium is benign and may be released in the atmosphere or used industrially. Boron hydride (B-H) is abundant, inexpensive, available, radiation-free. It cannot be "burned" (fused) by tokamaks or conventional mirrors or tandem mirrors because they cannot produce a sufficiently hot plasma ($6 \times 10^{11}$°C.). These devices are deficient in energy by about a factor of 17 just to burn d-t, the easiest of fuels. Their plasma energy must be increased by a factor of about 1700 to burn B-H. No way is seen to do this, using conventional RF, ohmic and neutral beam injection heating techniques. Further, none of the inventor's previous inventions, including that of U.S. Pat. No. 4,189,346, were able to recirculate plasma particles which had lost more than fifty percent of their energy. This was because the weakened particles could no longer sufficiently cut the magnetic field in their recyclotron (or ring cyclotron, as some were called) to get back to their electrode gap for reacceleration. Also, ions were initially injected from one side instead of in the main plane of spiral acceleration. This tended to make the particles spiral into the electrode sidewalls. Both of these defects have been remedied in the Recyclotron III. The improvements are far more than obvious. The electromagnets had to be heavily redesigned to provide input and output beam magnetic wells. These magnetic wells vastly improve the feasilibity of arranging recyclotrons in series. These are the most significant changes over previous inventions or applications. (Jarnagin's U.S. Pat. No. 4,202,725 is entirely different.) Accordingly, consider a new approach.

SUMMARY OF THE INVENTION

This invention offers to burn the ideal nuclear fusion fuel, boron hydride. To do this, the invention takes advantage of the fact that modest energies to particle accelerators correspond to enormous kinetic temperatures in a plasma. The invention reaccelerates B-H macromolecules and their unfused debris particles (protons and boron-11) into one another. High energy electrons are also recirculated with the ions to form a plasma of approximate net neutrality. This is to give a high density to the hot ionized gas and to increase the probability of fusion capture. Another key feature of this invention is that it returns its plasma particles in work-conservative magnetic fields not unlike satellites orbiting in a gravitational field. This lets the recirculation of the plasma occur virtually at transformer efficiencies. Still more, the product particles of this invention may be taken off entirely electrically instead of thermally for enhanced efficiency. In brief, this invention consists of high energy plasma reaccelerators which recirculate one another's output through a common reaction site. The reaccelerators consist of modified cyclotrons, called recyclotrons, which are designed with magnetic wells to guide returning plasma beams through themselves (the recyclotrons).

THE DRAWINGS

THEORETICAL CONSIDERATIONS

Several principles of plasma physics and also particle physics must be brought together compatibly to make this system work properly. In a plasma (a hot ionized gas of approximate net neutrality electrically), electrons and ions move about randomly and with different speeds. There will always be a small percentage of particles with very high speeds or velocities in any so called Maxwellian distribution. (J. C. Maxwell first analyzed gases mathematically.) The idea behind plasma fusion is to pump in energy and try to get adequate rates of fusion out of the faster moving fuel ions. A plasma is very convenient from a statistical point of view; it serves as a storage medium for energy put in. A magnetic confined plasma offers to reflect charged particles away from the walls. If designed properly, the confining electromagnets may turn the particles back generally toward one another a million times or more. Of course, the longer the confinement time the greater is the probability of fusion capture of one fuel ion by another.

In contrast with the statistical processes of plasma fusion, a colliding beam approach attempts to get fusion capture by single shots, by making the beam and target (which may be another head-on colliding beam) dense and of sufficient energy to overcome electrostatic repulsion. However colliding ion beams will not work. They cannot be made sufficiently dense because of space charge. Recirculating the noncollidals at one another could be helpful, if done at transformer efficiencies. But too much recirculation is still required because of the low density of ion beams.

Colliding plasma (not just ion) beams could be another story. Here, the idea is to create energy-dense beams by merging separately accelerated ions and electrons 50-50, to neutralize the space charge. At typical accelerator or plasma temperatures, the energetic electrons will not reassociate with ions to form neutral atoms. Thence, the plasma beams are to be collided either head-on (as in FIG. 1) or into a plasma, generally toward one another (as in FIG. 4). In either case, the noncollidals are to be returned as efficiently as possible, here, by work-conservative magnetic fields, hence at transformer efficiencies.

Figure 1:
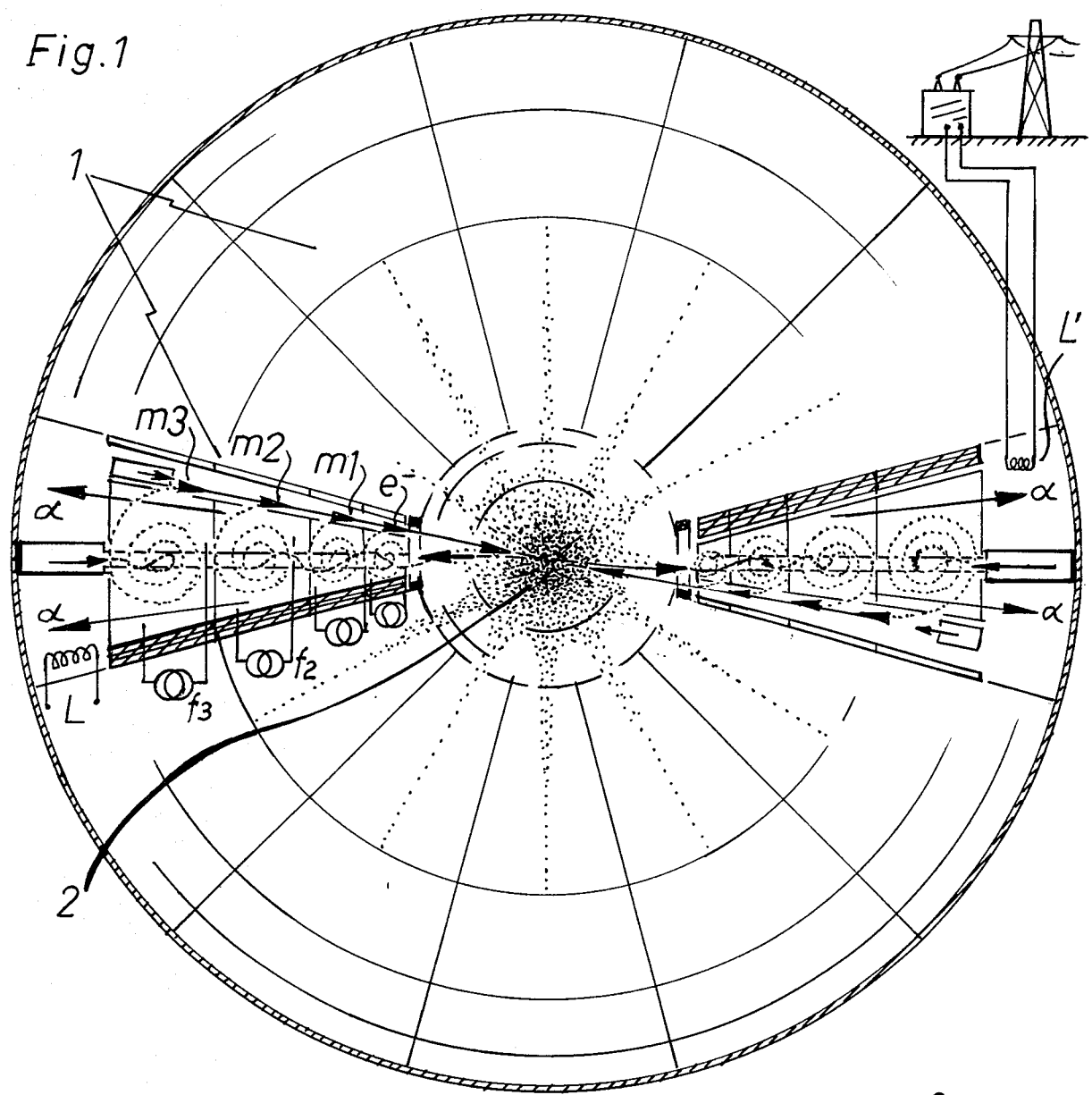
FIG. 1 illustrates a radial-spherical embodiment of the invention.
Figure 4:
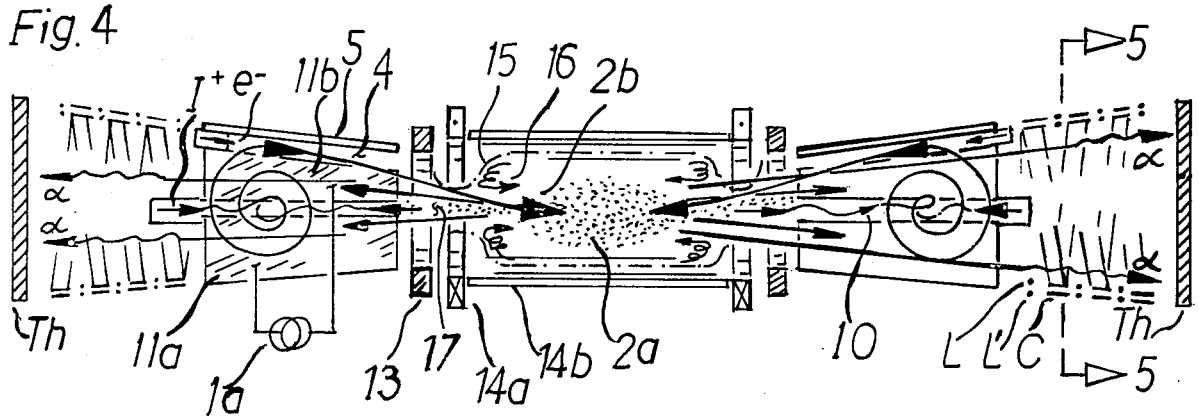
FIG. 4 illustrates a recyclotron-plugged magnetic mirror.

The tradeoff to be considered is whether to recirculate the plasma particles by external mechanisms (here, recyclotrons, explained shortly) or to let a magnetic confined plasma do the recirculating locally, with the plasma. The latter is indeed convenient; but magnetic confined plasmas diffuse the energy of injected particles downward toward the average and away from the optimal level for fusion capture. Whereas, recolliding plasma beams maintained at some optimal energy level may need to make only a hundredth or thousandth as many passes at one another, nearly head-on. Reactivity curves fall off very steeply on the low energy side. Accordingly, FIG. 1 shows a recolliding plasma beam system in which the central plasma is not magnetically confined. The central plasma scatters or passes promptly outwards to recyclotrons for (efficient) recirculation back toward the center. (Recyclotrons are cyclotrons modified to recirculate one another's output.) Focus rings help guide expanding plasma into the recyclotrons. Thence magnetic wells in the recyclotrons further guide and confine the plasma in a manner described shortly. Which is to say, in the final analysis, the plasma of FIG. 1 is magnetically confined by the recyclotrons; but the center of the system, the intended reaction site, is fieldless, a drift space. This can be called a surface contained plasma; it is shaped in the form of a spiky sphere. See FIG. 1. In contrast, the plasma of FIG. 4 is magnetically confined by a conventional magnetic mirror (a solenoidal winding with extra coils at the ends). Here, charged particles describe helical pathways around lines of flux and reverse their helical motion rather than proceed into denser field lines at the throat. Recyclotrons are plugged into the ends of this magnetic mirror. They reinject (re-energized) plasma particles back into the mirror. Thus, recirculation is here done by a combination of internal and external mechanisms. This "topology", as plasma people call it, may provide the best of plasma and particle physics. Massive fuel particles, particularly large boron hydride molecules ($B_2H_6$, . . . ) could largely penetrate the plasma and collide head-on. Thence, debris such as protons and boron-11 ions could be recollided by the magnetic field of the mirror many times. This recirculation-confinement is primarily at right angles to the main mirror axis. This is where the recyclotrons need it most.

Whereas, the recyclotrons recirculate and confine the plasma primarily ALONG the mirror's main axis, where the mirror needs it most. Together, the recyclotrons and the mirror of FIG. 4 should work superbly.

Importantly, if charged particles are to be reaccelerated (at least partially) to make up for lost energy, they must be separable from the outcoming plasma tongues. Specifically, the particles must be separated by electrodes connected to an oscillator in the recyclotrons. But dense plasmas shield an electrode and hinder charge separation. The distance significant numbers of electrons can be separated from ions is given by the Debye equation $D = (k_1 kT_e/ne^2) \exp \frac{1}{2}$, in SI units, where $k_1$ is a constant equal to $8.84 \times 10^{-12}$, $kT_e$ is the kinetic temperature of the electrons, n plasma density, e electronic charge. Electrode separation is helped by the fact that the system operates at relatively high temperatures and the density n falls off with the square of the distance from the center of the plasma. It can be seen by the equation that the electrode separation distance D is proportional to the square root of plasma energy divided by the plasma density. For returning plasma to be reseparated into ions and electrons, the plasma energy must be adequately high and the density low, in the recyclotrons. These conditions are operationally assisted by the fact that, after fusion, outcoming plasma will generally be hotter than when going in. Also, the plasma expands as it comes out, hence reduces its density. If particle count is conserved, the recyclotrons should indeed be able to reseparate the same number of particles they put together in the first place to form a plasma. In any case, if the plasma has an energy of about 1 MeV ($=1.6 \times 10^{-13}$ J) and if $n = 10^{21}$ ions/m³ in the recyclotrons, D is calculated to be several millimeters. This is quite adequate. Reseparation of the plasma is assured.

DETAILED DESCRIPTION OF THE PREFERRED EMBODIMENTS

Figure 2:
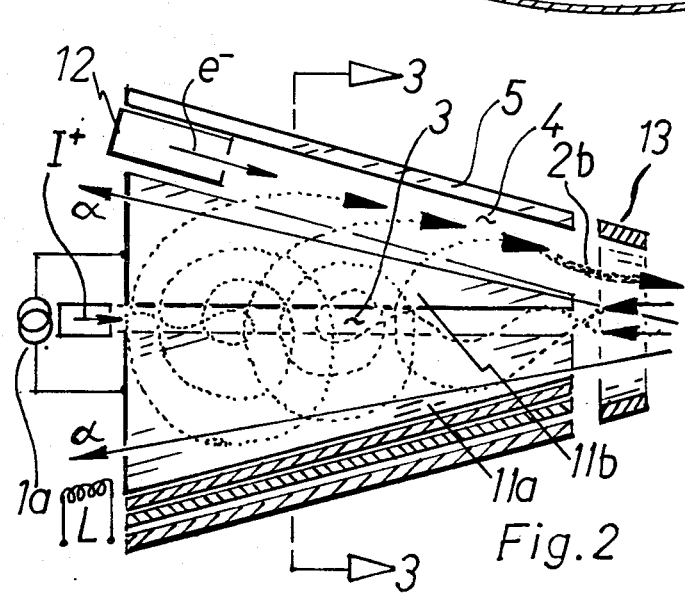
FIG. 2 shows a broadside section of a typical recyclotron, the key component of the invention.

FIG. 1 shows a radial-spherical embodiment of the invention consisting of opposing Recyclotron Modules 1 containing the subcomponents of FIG. 2. In FIG. 1, recyclotrons for electrons e⁻ and fuel atomic or molecular ions of masses m1, m2, m3 recirculate these particles into or through Central Plasma 2. Thence, charged product particles, Alphas α are guided out past Induction Coils L and Capacitors C of FIGS. 4, 5, 6, 7, 8. As explained shortly, the kinetic energy of the alphas is used to drive electrons around in an external loop, suggested by the unlabeled distribution transformer and tower of FIG. 1. In FIG. 1 oscillators of frequency f2 and f3 are shown connected to recylotrons for particles of mass m2, m3 respectively.

Figure 3:
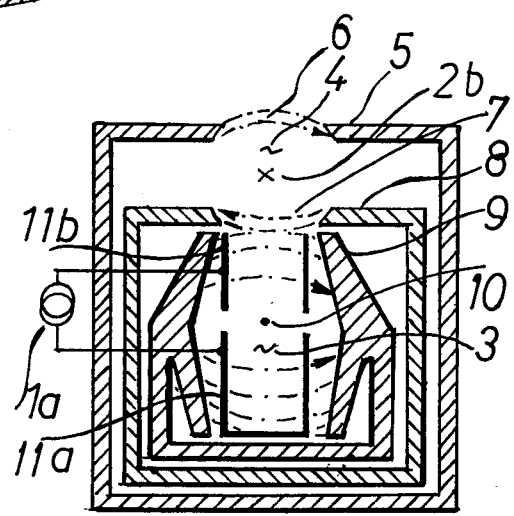
FIG. 3 is a cross section of FIG. 2 and shows the laminated arrangement of electromagnets about a channel electrode.

FIG. 2 shows representative details of a typical recyclotron. Ions I⁺ are injected into Input Magnetic Well 3, which well is formed by indenting the pole faces of Primary Electromagnet 9 of FIG. 3. Elongated Electrodes 11a and 11b, connected to Oscillator 1a (all shown in FIG. 3) rather sinusoidally accelerate charged particles traveling along Input Magnetic Well 3 from either direction. This includes Return Beam 10 in FIG. 3. Only particles in resonance with the local magnetic field and the applied oscillator will be systematically accelerated and deflected into a spiral pathway as suggested in FIGS. 1, 2, 4, 9. The spiral pathways may indeed overlap. Customary cyclotron theory applies, as given in many textbooks. Accelerated particles are extracted from their outer orbit by means of an Iverter Electromagnet 8 of reverse polarity, which deflects particles in an opposite rotational sense. This magnet's polefaces are tapered to help create Output Beam Magnetic Well 4. This poleface-shaping and also Field Lines 7 are suggested in FIG. 3. Output Beam 2b is further guided by Reinverter Electromagnet 5 with shaped polefaces and Field Lines 6 of FIG. 3. Focus Coil 13 of FIGS. 2 and 4 further guide beams into and out of the recyclotrons. In addition to the electron recyclotrons in FIG. 1, Electron Gun 12 of FIGS. 1 and 2 may be used to finetune the electron count in plasma Output Beam 2b.

FIG. 4 represents a recyclotron-plugged Magnetic Mirror 14. Into Mirror Plasma 2a, plasma beams are reinjected as before. The magnetic mirror (of Solenoidal Coils 14b and Extra Coils 14a) is not part of this invention, but is shown to illustrate the embodiment of the recyclotrons. Mirror Field Lines 15 helically reflect Charged Particles 16. Recyclotrons reinject particles which leave via Loss Cone 17. FIG. 4 also shows stretched, spirally shaped, Capacitors C, Induction Coils L, L' and Thermal Blanket Th for electrical and thermal energy removal respectively.

Figure 5:
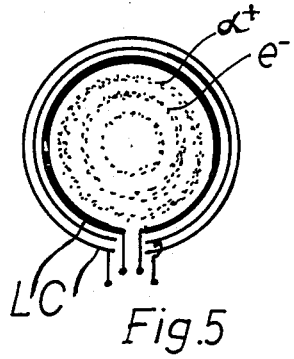
FIG. 5 shows inductive-capacitive (LC) loops which are to remove electrical energy from the system.
Figure 6:
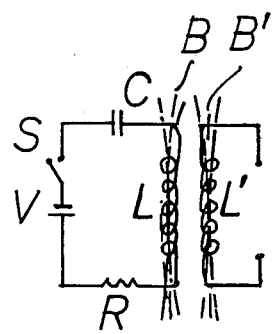
FIG. 6 is an equivalent circuit.
Figure 7:
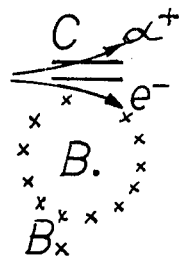
FIGS. 7 and 8 show deflection of oppositely charged moving particles in opposite directions in a magnetic field.
Figure 8:
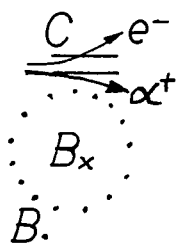

FIG. 5 suggests a separation of $\alpha^+$ and $e^-$ particles by LC loops. A customary equivalent circuit is shown for an oscillator in FIG. 6. This is explained in many textbooks on electronics. Briefly, when switch S is closed, voltage source V sends electrons to one side of capacitor C, creating an opposite charge on the other side of C. Electrons then run around to the other side. In passing through inductive coil L, the electrons create a magnetic field of inductive strength B. B tends to keep the electrons going in a given direction. A lag develops between the charging of C and the creation/destruction of B. Thus the circuit oscillates so long as V is applied. Mild resistance R is needed. A similar oscillation is induced in coil L', the output loop, and its magnetic induction B'. The invention at hand (concerning energy removal) consists of shaping L and C as suggested in FIGS. 4 and 5, and substituting moving charged particles (alphas and electrons) for V of FIG. 6. The kinetic energy $\frac{1}{2} mv^2$ of the moving particles goes into electrical energy $\frac{1}{2} CV^2$ of the LC loops, where m is mass, v velocity of a particle, C capacitance, V the equivalent voltage through which the moving particle would have had to have been accelerated. In FIG. 4 electrons and alphas come out of the central plasma at different velocities and they are focussed differently by Focus Coil 13. These factors result in the charge lamination of FIG. 5. This in turn results in a momentary charge of helical capacitor C (FIG. 4) on the inside, as in FIG. 7 and the creation of B. and Bx coming out of and going into the plane of the paper respectively. A moment later the situation is reversed as in FIG. 8. AC electrical power is thus offered at L' in FIGS. 1 and 4. This is in contrast with a DC method invented by R. F. Post and described in F. F. Chen's textbook on plasma fusion published by Plenum Press 1977.

Figure 9:
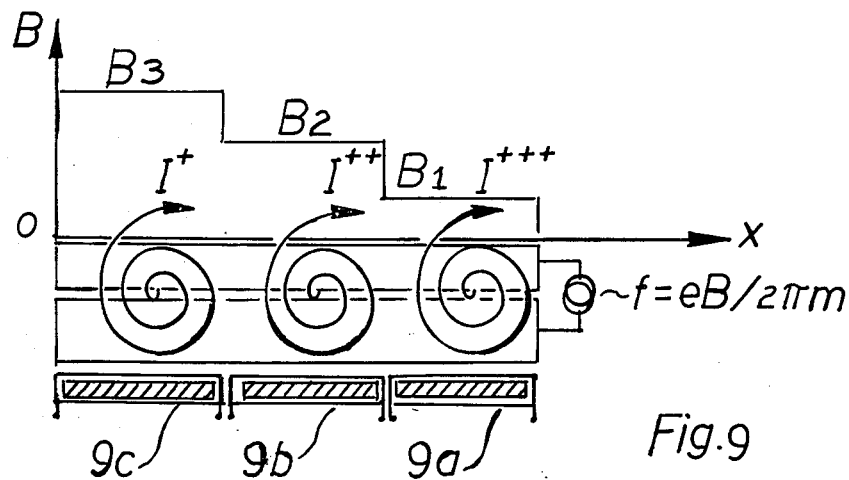
FIG. 9 illustrates schematically a stepping of magnetic induction B in a series of recyclotrons in order to circulate particles of different charge or different mass.

FIG. 9 shows a way particles of negligibly different masses but different states of ionization (such as boron-11 ionized in levels 1,2,3) may be recycled by a single oscillator tuned to frequency $f = eB/2\pi m$, where the symbols are the same as before. Electromagnet coils 9a, 9b, 9c are given different currents to create magnetic induction B1, B2, B3 respectively.

The invention is intended to include the disclosed embodiments and obvious or equivalent modifications as may occur to those skilled in the art.

The inventor, William S. Jarnagin, claims:

1. A recyclotron nuclear fusion system comprising a plurality of recyclotrons, each said recyclotron comprising cyclotron means for receiving and accelerating charged particles in spiral and work conservative pathways, and output means for forming a beam from particles received from said cyclotron means;
   (i) said cyclotron means comprising
      (a) a channel shaped electromagnet having a pair of indented polefaces, oriented along an input axis and defining an input magnetic well,
      (b) a pair of elongated linear electrodes centered along said input magnetic well arranged generally parallel to said input axis and having a gap therebetween,
      (c) tuned oscillator means connected to said electrodes for applying an oscillating electric potential thereto,
   (ii) said output means comprising
      (e) inverter means comprising an electromagnet having a polarity opposite that of the channel shaped electromagnet oriented contigously therealong for extracting fully accelerated particles from said cyclotron means,
      (f) reinverter means comprising an electromagnet having a polarity the same as that of the channel shaped electromagnet for correcting the flightpath of the extracted particles, said inverter means and said reinverter means defining an output axis, said output means directing said beam along said output axis;

each of said plurality of recyclotrons being arranged so that particles of its output beam are received by the input magnetic well of an opposing similar recyclotron.

2. A recyclotron nuclear fusion system as in claim 1, wherein said channel shaped electromagnet comprises a plurality of electromagnets arranged in series along said input axis having different magnetic inductive strengths and wherein said tuned oscillator means comprises one or more oscillators tuned to accelerate and reaccelerate fuel particles of different masses or charges.

3. A recyclotron nuclear fusion system as in claim 1, further comprising a plurality of magnetic mirror means for reflecting particles back towards a central plasma, each of said magnetic mirror means being located intermediate the central plasma and one of said recyclotrons, whereby the recyclotrons receive and reinject plasma particles through a loss cone defined by a small solid angle coaxial with a main axis of said mirror.

4. A recyclotron nuclear fusion system as in claim 1, further comprising helically wound inductive-capacitive coils extending from an end of each recyclotron opposite the direction of its output beam.

5. A recyclotron nuclear fusion system as in claim 1, wherein said plurality of recyclotrons are arranged in a generally spherical array, each recyclotron being radially tapered and having its output beam directed toward the center of the generally spherical array.

* * * * *